United States Patent [19]

Pomies et al.

[11] Patent Number: 4,800,936
[45] Date of Patent: Jan. 31, 1989

[54] MACHINE FOR FELLING AND SHAPING TREES

[75] Inventors: Jean-Pierre Pomies, Montargis; Bernard Gomel, Joigny, both of France

[73] Assignee: Societe Industrielle et Forestiere d'Etudes et de Realisations (Sifer), Echouboulains, France

[21] Appl. No.: 123,723

[22] Filed: Nov. 23, 1987

[30] Foreign Application Priority Data

Nov. 24, 1986 [FR] France ................. 86 16305

[51] Int. Cl.$^4$ .............................................. A01G 23/08
[52] U.S. Cl. .................... 144/3 D; 144/2 Z; 144/34 R; 144/336
[58] Field of Search ............ 144/2 Z, 3 D, 34 R, 144/34 E, 335, 336, 343

[56] References Cited

U.S. PATENT DOCUMENTS

| | | | |
|---|---|---|---|
| 3,542,009 | 11/1970 | Gibson | 144/3 D |
| 3,643,712 | 2/1972 | Doel et al. | 144/3 D |
| 3,735,786 | 5/1973 | Vit | 144/2 Z |
| 3,797,541 | 3/1974 | Kurelek et al. | 144/34 D |
| 4,083,463 | 4/1978 | Ericsson | 144/34 R |
| 4,124,047 | 11/1978 | Dressler et al. | |
| 4,412,777 | 11/1983 | Forslund | 144/34 R |

FOREIGN PATENT DOCUMENTS

| | | | |
|---|---|---|---|
| 3524570 | 1/1986 | Fed. Rep. of Germany . | |
| 2314435 | 1/1977 | France . | |
| 197808 | 8/1977 | U.S.S.R. | 144/34 R |
| 613742 | 7/1978 | U.S.S.R. | 144/34 R |

Primary Examiner—W. Donald Bray
Attorney, Agent, or Firm—Hoffman, Wasson, Fallow & Gitler

[57] ABSTRACT

A machine for felling and shaping trees is provided with a work head suspended by at least two perpendicular joints one of which makes possible its horizontal swivel and the other a certain angular freedom in the vertical plane and carried by a frame consisting of a beam comprising at least a free space intended to neutralize the joint of vertical angular freedom in felling position.

4 Claims, 2 Drawing Sheets

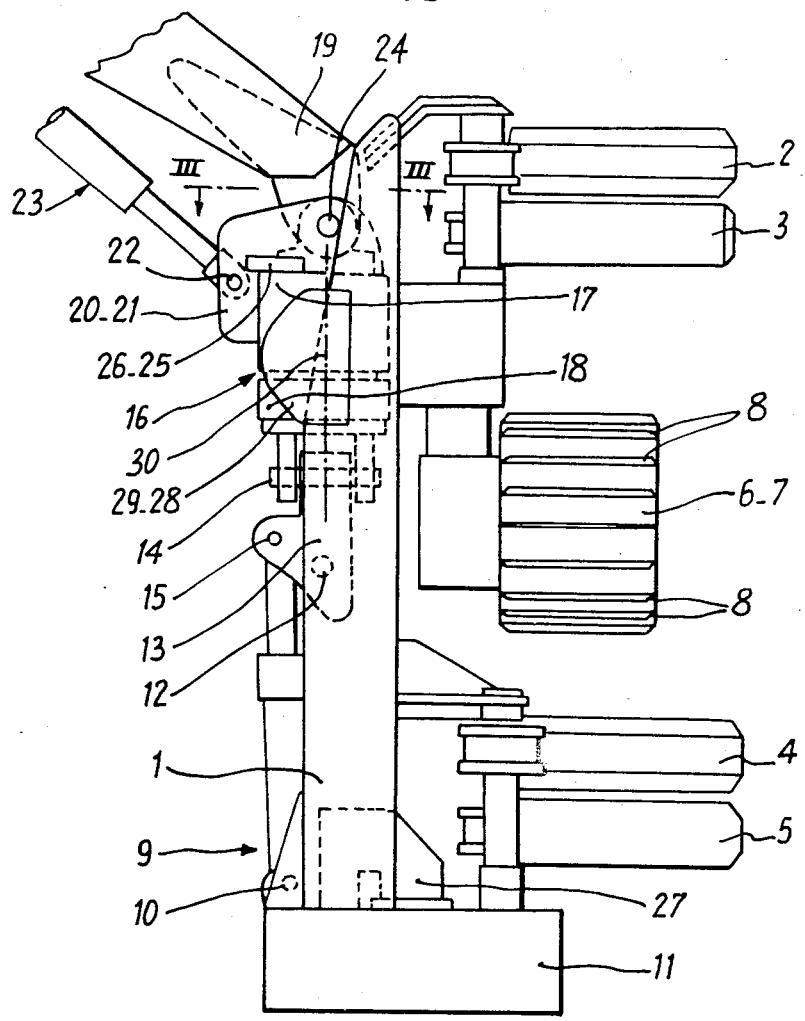
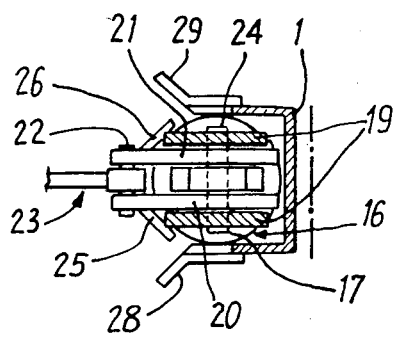

MACHINE FOR FELLING AND SHAPING TREES

This invention relates to a machine for felling and shaping trees, and particularly a work head for such a machine.

There are two designs for work heads that equip known machines which can assure the felling of trees and their shaping.

According to the first design, the work head possesses, in felling position and in shaping position, the same angular freedom in the vertical plane. How, if it is desirable that in shaping position the work head be able to be adapted to the position of the tree to be shaped without need for maneuvering the device carrying the work head, there is, on the other hand, an advantage in reducing this angular freedom when the work head is used for felling, so as to reduce the forces undergone by the arm carrying the work head. Actually, the more the angular freedom increases, the more the overhang increases and, given the forces at play, such dimensions of this arm and of the carrying device are then reached—if it is desired to fell something other than bushes—that its weight becomes prohibitive and the bulk results in serious difficulties for entering stands, indeed even prohibits this entry.

For this reason, according to the second design, the work head has, in felling position, an angular freedom that is less than the one it has in shaping position. But then there is another drawback which resides in the greater complexity of design of this head, because it must comprise, in addition to the elements intended for shaping and for felling, the device assuring the restriction of the angular freedom in felling position.

This invention has as its object to eliminate this drawback by proposing a work head whose design gives it the desirable angular freedom in shaping position and the restriction of this freedom in felling position without it being necessary to add a special device.

According to the invention, a machine for felling and shaping trees is equipped with a work head which comprises drive and trimming means for the shaping and gripping and cutting means for the felling, the gripping means being able to comprise the drive and trimming means and which is suspended from a carrier arm by at least two joints perpendicular to one another, one of these joints making possible horizontal swiveling of the head while the other gives it a certain angular freedom in the vertical plane, and is characterized in that said work head is carried by a frame comprising a beam provided with at least one free space intended to neutralize the joint of vertical angular freedom when the work head is in felling position.

According to a advantageous variant embodiment of the invention, the beam constituting the frame of the work head exhibits a U-shaped section which provides an increase in stiffening without an increase in weight.

According to another advantageous variant, the beam constituting the frame of the work head restricts the swiveling of the entire head around the unblocked joint, the advantage of this arrangement being the limitation of risks arising from too great an overhang in relation to the support polygon of the carrier.

Other characteristics and advantages of the invention will come out during the following description with reference to the three accompanying drawings which give in a nonlimiting and by way of information, an examplary of embodiment of the invention.

FIG. 2 shows the same head in felling position.

FIG. 3 is a partial section along line III—III of FIG. 2.

Figure 1:
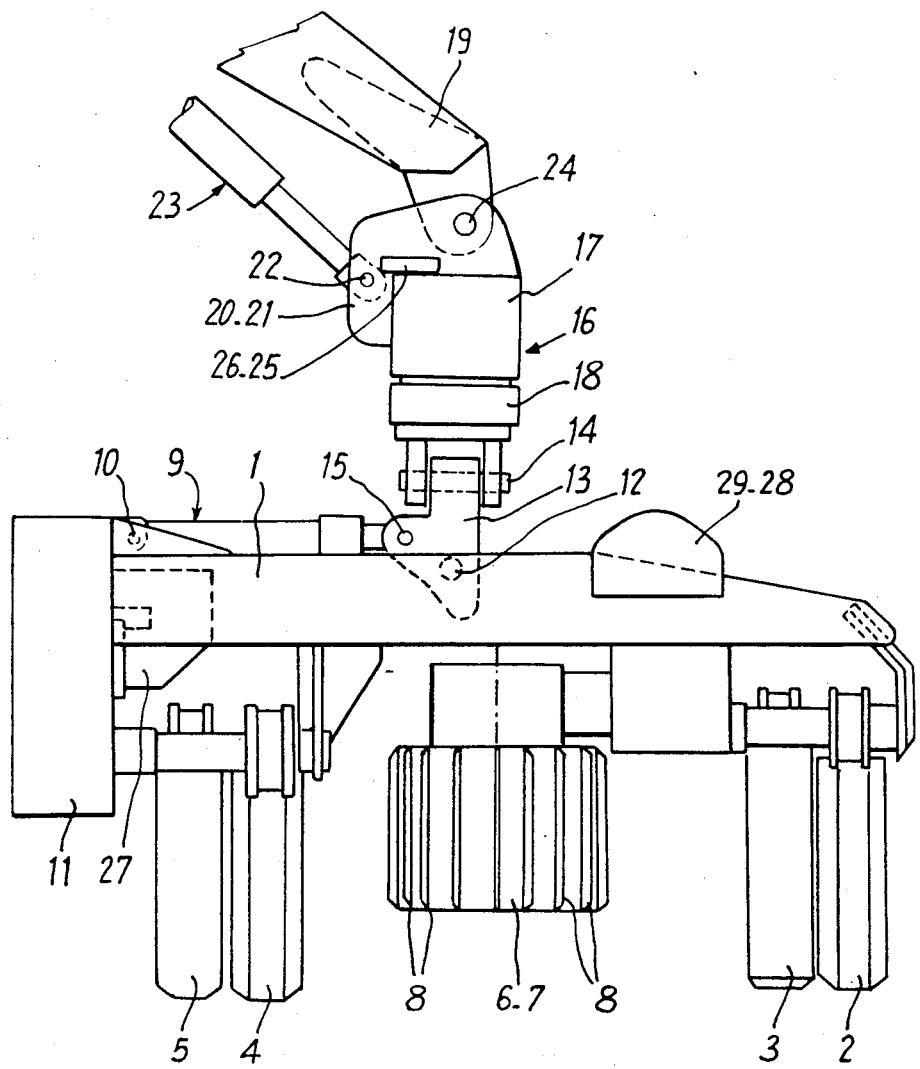
FIG. 1 shows a work head according to the invention in shaping position.

The frame of the work head comprises a beam 1 whose section is U-shaped and which carries four cutters 2, 3, 4 and 5 that are mobile and grouped two by two opposite one another, two rollers 6 and 7 equipped with blades 8 on their periphery, two slightly bent plates 28 and 29, a case 11, and a hydraulic cylinder 9 whose body is pivoted at 10 on beam 1 and whose rod is pivoted on a pin 15 carried by a part 13 which also carries a second pin 12 on which beam 1, and therefore the entire work head, is pivoted.

Part 13 is suspended by a pin 14 perpendicular to pin 12, on a yoke 16, which comprises two parts 17 and 18 turning in relation to one another around pin 30, thanks to a hydraulic device (not shown because not a part of the invention) part 17 being suspended by a pin 24 on a carrying arm 19 whose end alone appears on the drawing.

On part 17 of yoke 16 are welded two stopping plates 20 and 21 which carry, on the one hand, a pin 22 on which is pivoted the rod of a second hydraulic cylinder 23 whose body (not shown) is itself pivoted on carrying arm 19 and, on the other hand, two stops 25 and 26, the first welded to plate 20 and the second to plate 21.

Case 11 protects a standard sectioning device, not shown or described because not a part of the invention, and of which 27 constitutes the control group.

Under these conditions, the operation is set up as explained below.

In its shaping position, which is illustrated in FIG. 1, part 18 of yoke 16 freely turns in relation to part 17 around pin 24 and, consequently, the work head, suspended on this part 18, can take any angular position in relation to part 17 of the yoke and, therefore, in relation to carrying arm 19 on which it is pivoted.

Also, the work head can swivel freely around both pins 12 and 14, the free swiveling around 12 making it possible for it to maintain its horizontal position when yoke 16 is inclined toward the front or toward the back, under the action of cylinder 23, to place correctly the work head in relation to the tree to be shaped, and the angular freedom around pin 14 making it possible to avoid the transmission—to yoke 16 and to carrying arm 19—of lateral jerks during shaping.

To put the work head in the felling position illustrated in FIG. 2, if necessary carrying arm 19 is lifted and cylinder 9 is actuated to extend. This tends to separate pins 10 and 15 from one another; but since pin 15, taken into suspension part 13, cannot move, pin 10 moves, thus causing the entire work head to swing around pin 12.

In this movement, a part of the U-shaped beam which constitutes the frame of the work head is fitted on the unit of yoke 16 as it appears in FIG. 3, thus neutralizing pin 14 and eliminating all angular freedom of the work head around this pin. The work head can thus be maneuvered without danger of swinging that can jeopardize the stability of the device on which carrying arm 19 is fastened. This arrangement, known in the art, is obtained by the particular shape alone of the beam carrying the work head, a shape which, moreover, contributes a stiffening of this beam without increasing its weight.

Given that it involves a piece of equipment which performs under very harsh conditions, the various pins can take certain wear. But this wear should not create a obstacle to the good operation of the unit. For this reason, frame 1 has been equipped with bent plates 28 and 29 which, in case of wear, particularly of pin 12, assure the guiding of yoke 16 to bring it between the sides of the U-shaped beam.

The illustrated work head exhibits another advantage in felling position, namely the limitation of its angular clearance around pin 24, as can be seen in FIG. 3.

Actually, if part 18 of yoke 16 is made to turn in relation to part 17, beam 1 is itself driven in rotation, but only until one of the flanges of the beam comes in contact with one of stops 25 and 26 and thus stops the rotation movement, such an arrangement constituting a guarantee against maneuvers that risk causing too great an overhang of the work head in relation to the carrying device or damaging the hoses.

To return to shaping position, cylinder 9 is maneuvered in the other direction: pin 10 approaches pin 13, which causes the work head to return to horizontal where it is in shaping position.

It is understood that, without going outside the invention, it is possible to modify the design details in the devices described or in their arrangements to obtain the same result.

For example, it would be possible to replace double acting cylinder 9 with a single-acting cylinder. In this case, the return of the work head to shaping position would be performed automatically by the weight itself of this head thanks to the redistribution of its weight neutralizing said cylinder, a device being provided on the hydraulic circuit to control the return of said head and/or the speed of this return.

Instead of being located on yoke 16, stops 25 and 26 could be installed on carrying arm 19 itself.

The frame of the work head could have an I-shaped section so long as the flanges of the I have a dimension making possible the blocking of pin 14, or even consist of a beam of assembled shapes so long as their arrangement leaves a free space assuring the blocking of said pin 14.

We claim:

1. A machine for felling and shaping trees, said machine being attachable at the end of a support arm, said machine comprising:
    a yoke having an upper portion for attachment to said support arm and a lower portion rotatable around a vertical axis with respect to the upper portion,
    a mounting bracket pivotally connected to said lower yoke portion along a first horizontal axis,
    a beam, with a U-shaped cross section, having flanges defining a housing for said yoke, said beam being pivotally connected to said bracket along a second horizontal axis perpendicular to the first axis, said beam having connected thereto driving means and trimming means for shaping a tree, and gripping means and cutting means for felling a tree,
    means connected between said bracket and said beam for moving said beam between a horizontal position for shaping trees, and a vertical position for felling trees, and further comprising means, operable only when said beam is in its vertical position, both for preventing said beam from rotating about said first horizontal axis and for permitting only limited movement of said beam about said vertical axis.

2. A machine according to claim 1, further comprising stop means for limiting the pivotal movement of said beam about said vertical axis when said workhead is in its upright position.

3. A machine according to claim 2, wherein said stop means comprise a pair of stop plates mounted on said upper part of the yoke for engaging the flanges of the U-shaped beam.

4. A machine according to claim 1, further comprising means for guiding said yoke between the flanges of said U-shaped beam.

* * * * *